United States Patent
Eliezer et al.

(10) Patent No.: US 6,735,260 B1
(45) Date of Patent: May 11, 2004

(54) ADAPTIVE DATA SLICER

(75) Inventors: Oren Eliezer, Sde-Varburg (IL); Yaron Kaufmann, Tel Aviv (IL); Yasuhiro Satoh, Hiji-machi (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/550,569

(22) Filed: Apr. 17, 2000

(51) Int. Cl.$^7$ .............................. H04L 27/22; G11B 5/09
(52) U.S. Cl. ......................................... 375/316; 360/39
(58) Field of Search ................................. 375/316, 318, 375/345, 286; 327/58, 100; 348/476, 622

(56) References Cited

U.S. PATENT DOCUMENTS

| | | | |
|---|---|---|---|
| 3,832,577 A | | 8/1974 | Harr |
| 3,835,248 A | * | 9/1974 | Harford ...................... 348/683 |
| 3,947,769 A | * | 3/1976 | Rousos et al. .............. 375/318 |
| 4,115,811 A | | 9/1978 | Goff |
| 4,937,842 A | * | 6/1990 | Howell ....................... 375/345 |
| 5,371,763 A | * | 12/1994 | Ota et al. .................... 375/319 |
| 5,377,054 A | * | 12/1994 | Yamaguchi et al. .......... 360/39 |
| 5,430,766 A | * | 7/1995 | Ota et al. .................... 375/318 |
| 5,469,115 A | * | 11/1995 | Peterzell et al. ............ 330/129 |
| 5,561,469 A | | 10/1996 | Schultz |
| 5,563,893 A | * | 10/1996 | Lai ............................. 714/709 |
| 5,946,355 A | | 8/1999 | Baker |
| 5,966,387 A | * | 10/1999 | Cloutier ...................... 370/516 |
| 6,069,499 A | | 5/2000 | Cho et al. |
| 6,151,150 A | * | 11/2000 | Kikuchi ...................... 398/209 |
| 6,292,058 B1 | * | 9/2001 | Ide et al. .................... 330/279 |
| 6,359,942 B1 | * | 3/2002 | Duggan et al. ............. 375/335 |
| 6,442,216 B1 | * | 8/2002 | McLaughlin et al. ....... 375/322 |

FOREIGN PATENT DOCUMENTS

| | | |
|---|---|---|
| EP | 0 466 329 A2 | 1/1992 |
| EP | 0 581 455 A | 2/1994 |
| EP | 0 814 462 A2 | 12/1997 |
| JP | 2-184108 | 10/1990 |

* cited by examiner

*Primary Examiner*—Stephen Chin
*Assistant Examiner*—Lawrence Williams
(74) *Attorney, Agent, or Firm*—W. Daniel Swayze, Jr.; W. James Brady; Frederick J. Telecky, Jr.

(57) ABSTRACT

An adaptive data slicer which functions to adapt to changes in the properties of a signal input thereto by producing a near optimal slicing threshold in accordance with the input signal for use in a decision circuit. The slicing level is considered optimal when its use in the decision circuit minimizes the bit error probability. The data slicer utilizes two peak detectors, a maximum peak detector for detecting the highest levels of the input signal and a minimum peak detector for detecting the lowest levels of the input signal.

33 Claims, 4 Drawing Sheets

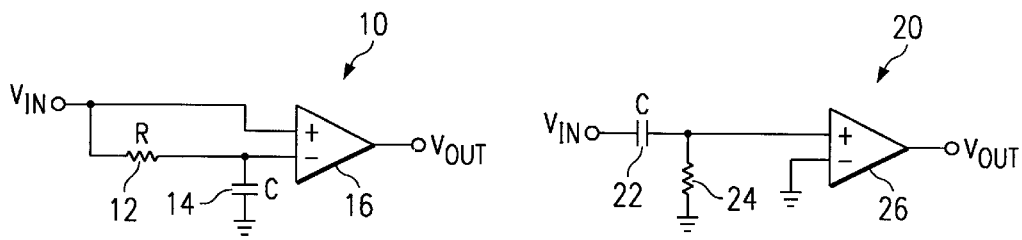
FIG. 1
*(PRIOR ART)*
FIG. 2
*(PRIOR ART)*
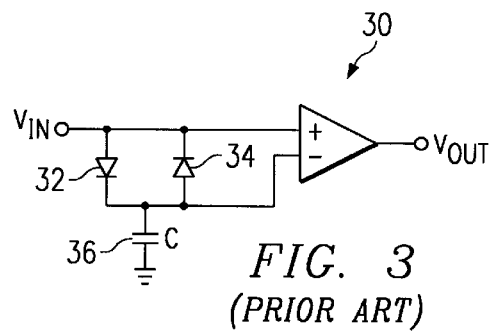
FIG. 3
*(PRIOR ART)*
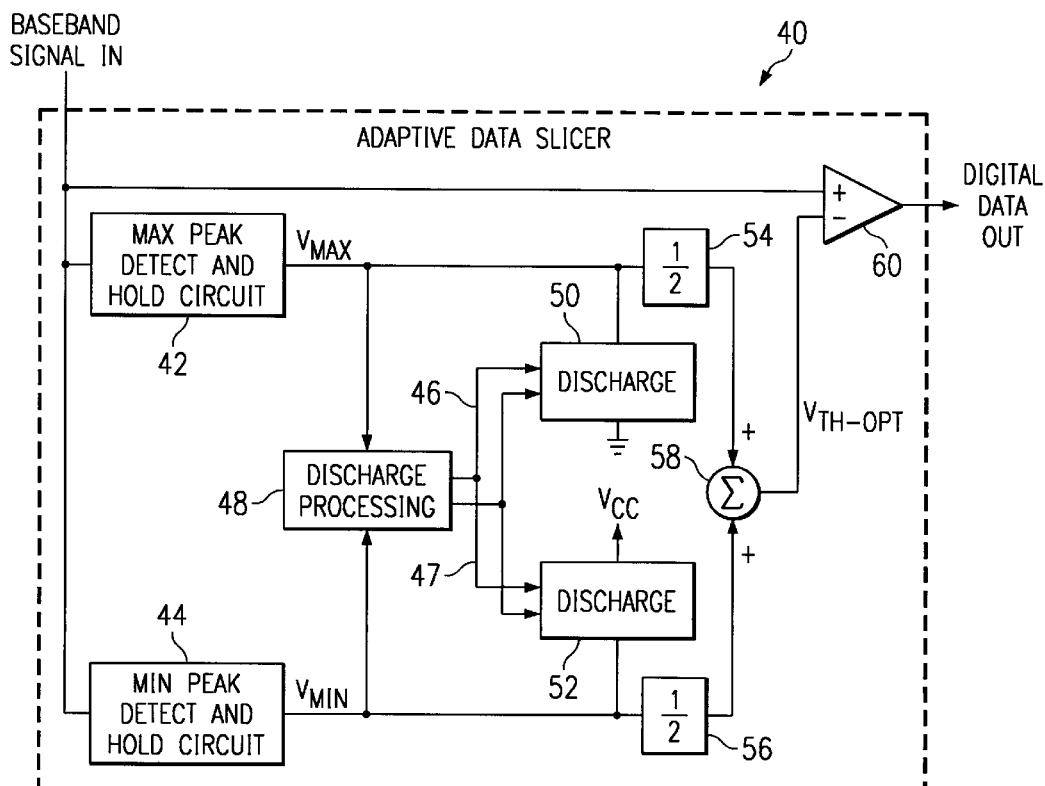
FIG. 4

ADAPTIVE DATA SLICER

FIELD OF THE INVENTION

The present invention relates generally to data communication systems and more particularly relates to an adaptive data slicer circuit based on peak detectors having dynamic selection of operating parameters.

BACKGROUND OF THE INVENTION

Data slicers, well known in the electrical arts, are commonly used in communications receivers to recover the digital data at the output of a demodulator. For example, in a frequency shift keying (FSK) receiver, such as that used in a communications system constructed in accordance with the Bluetooth specification, a common realization of the demodulator is as a frequency discriminator operating at some intermediate frequency (IF). The discriminator functions to recover the original baseband signal from the IF signal.

In the typical system, the signal at the output of the demodulator can be represented as a combination of (1) the original baseband signal used to convey the data transmitted by the transmitter; (2) additive noise and interference contributed by the wireless channel; and (3) the distortion caused by the actual circuitry the signal passes through. At the output of the demodulator, a decision circuit known as a 'data slicer' is typically used to convert the baseband signal into a stream of data bits. It is the goal of the data slicer to perform this conversion such that the content of the data bits match closely as possible the content of the original transmitted data.

In addition to reproducing the transmitted data with a minimum bit error rate (BER), the data slicer should be able to overcome variations in the properties or characteristics of the signal. Such variations may be due to receiving signals from multiple transmitters and may include variations in modulation factors and carrier frequency errors such as drift. Thus, it is desirable to have a data slicer whose slicing threshold (which is used to compare the baseband signal with) is determined adaptively and is not fixed at a predetermined level. The optimum slicing threshold level should be determined independently for each received packet and should be adapted throughout reception of the packet to compensate for possible frequency droop during its transmission.

As described above, the frequency offset and other parameters of the received signal in a communications system could have an effect on the DC level of the recovered baseband signal at the output of the demodulator (e.g., at the output of a FM discriminator). Consequently, the optimal slicing threshold is not fixed and typically varies over time. Depending on the application, it is preferable and sometimes necessary, for the slicing circuit to be sufficiently dynamic and adaptive to determine the optimum threshold for data slicing for each packet received, usually at the beginning of the packet during the preamble.

With the advent today, however, of wireless communications systems employing packets having a shortened length and shortened time slots, this becomes difficult to achieve with prior art slicing circuits. For example, the packets used in the Bluetooth protocol comprise a short 4-bit preamble and are transmitted using a spread spectrum frequency hopping scheme wherein the slot times are 625 $\mu$sec. The high hopping rate, short slot times and short preamble dictate that the data slicer be able to very quickly adapt the slicing decision threshold used to generate the received digital data.

On the other hand, in order to minimize the BER in the recovery of the payload contents of the packet, the slicing threshold should remain close to optimal with minimal variations thereto. This, however, creates conflicting requirements for the time constants associated with the determination of the slicing threshold. On the one hand, it is desirable to have quick adaptation of the slicing threshold during packet acquisition (i.e., during the preamble, etc.) and on the other hand it is desirable to have slow adaptation of the slicing threshold during reception of the payload in order to minimize the BER.

For example, in the Bluetooth protocol, the payload is preceded by an access code that is able to tolerate a higher BER. It is desirable, therefore, to determine the optimal slicing threshold level during reception of the access code even though the BER may be relatively high. After a valid access code is detected, it is desirable if the slicer could utilize longer time constants thus yielding a more stable slicing level during the reception of the payload portion of the packet.

Several examples of prior art adaptive slicing circuits will now be presented. A block diagram illustrating a first prior art data slicer circuit that utilizes a RC combination for smoothing the input voltage is shown in FIG. 1. The data slicer, generally referenced 10, comprises a slicing comparator 16 and a RC combination made up of resistor 12 having a value R and capacitor 14 having a value C. In operation, the RC functions to smooth the input voltage $V_{IN}$ such that an average of the voltage over time is input to the inverting terminal of the op amp. The principle is that over time, the capacitor functions to smooth the input voltage. Over time, the voltage across the capacitor represents the average of the input voltage and is used as the threshold or slicing voltage for determining the output data. The slicing comparator functions to compare the input voltage to the average voltage developed across the capacitor. If the input voltage is greater, a '1' is output and if the input voltage is lower, a '0' is output.

A disadvantage of this data slicer circuit is that is cannot quickly adapt to packets having a relatively short length. Optimum performance is achieved only when the circuit is configured to adapt slowly and using long packets having substantially equal numbers of 0's and 1's. The performance of the circuit severely degrades with short packets that may contain long sequences of 0's or 1's. In such a circuit, the use of a fast time constant for C results in degraded performance in terms of BER and may result in the loss of synchronization.

A block diagram illustrating a second prior art data slicer circuit that utilizes a DC blocking capacitor is shown in FIG. 2. The data slicer, generally referenced comprises a slicing comparator 26 (hard limiter or 1 bit A/D), capacitor 22 having a value C and a resistor 24 having a value R. In operation, the capacitor cancels the DC level since the voltage across the capacitor is subtracted from the input voltage. The input voltage across the resistor now swings through zero. To generate the output data, the voltage across R is compared with the slicing voltage that can comprise a voltage fixed at ground level. Since the capacitor functions to cancel the DC, any fluctuations represent peaks of the signal. The slicing comparator outputs a '1' for voltage swings above ground and a '0' for swings lower than ground.

The disadvantages of this circuit are similar to those of the first prior art slicer described above. The circuit cannot quickly adapt to packets having a relatively short length. High performance is achieved only with slow adaptation, i.e., long time constant for C, and when using long packets having substantially equal numbers of 0's and 1's. The performance of the circuit severely degrades with short packets that may contain long sequences of 0's or 1's. In such a circuit, the use of a fast time constant for C results in degraded performance in terms of BER and may result in the loss of synchronization.

A block diagram illustrating a third prior art data slicer circuit that utilizes two diodes in parallel is shown in FIG. 3. The data slicer, generally referenced 30, comprises a slicing comparator 38, diodes 32, 34 and capacitor 36 having a value C. In operation, the capacitor is charged and discharged through the diodes so that its voltage tracks the average of the peaks of the input signal. For optimal operation of the circuit, the peak to peak voltage of the input signal is preferably two times the diode drop (i.e., 1.2 $V_{P-P}$ for 0.6 V silicon diodes). Thus, the amplitude of the input signal is adjusted so as to have a direct relationship with the forward biasing voltages of the diodes.

A disadvantage of this circuit is that the performance of the circuit (measured in BER versus $E_b/N_o$ or SNR) is degraded with variations in the peak to peak voltage of the input signal.

Consider the case where the input signal comprises the output of an FM discriminator. In this case, the variations in the peak to peak of the output voltage may be caused by variations in the modulation index, variations in the gain of the discriminator and by additive noise introduced by the channel and/or the receiver circuitry itself.

Even in the case where such variations do not occur and in the absence of additive noise, however, a degradation of performance can occur due to the data itself being transmitted. In other words, the peaks recovered in the baseband circuitry (i.e., by the discriminator) vary in accordance with the data transmitted due to the ISI inherent in the signal. In all three prior art data slicing schemes presented above, optimum circuit operation is achieved only when the data being transmitted consists of a substantially equal number of 0's and 1's. In addition, optimum performance is only achieved after long periods of time and when the circuits are configured with a relatively long time constant. A long time constant is achieved by using a relatively large capacitance in all three circuits 10, 20, 30. Thus, the prior art circuits perform well only in cases where the packets or messages being sent are relatively long and the contents comprise nearly equal numbers of 0's and 1's.

In cases where the packets sent are relatively short and the number of 0's and 1's are not necessarily equal, the prior art circuit's BER performance is severely degraded. The circuit of FIG. 3, however, has reasonable performance degradation even when these conditions are not satisfied. For example, the relatively short preamble and short packet lengths of the transmission signals specified by the Bluetooth protocol do not permit the use of large time constants in the data slicer. The use of large time constants would help smooth out the slicing voltage input to the slicing comparator. Their use, however, with short packets such as used in the Bluetooth protocol is precluded due to the degradation of performance.

An adaptive data slicer may also be realized digitally using digital sampling and processing. When integrated together with the transceiver on a single integrated circuit, however, such a data slicer would likely consume relatively large amounts of current, take up large areas of silicon and may possibly be a source of noise when high data rates, e.g., 1 Mbps of Bluetooth, are used.

SUMMARY OF THE INVENTION

The present invention is an adaptive data slicer which functions to adapt to a changing input signal by producing the optimal slicing threshold for use in a decision circuit. The data slicer utilizes two peak detectors: (1) a maximum peak detector for detecting the highest levels of the input signal typically corresponding to sequences of 1's in the transmitted data and (2) a minimum peak detector for detecting the lowest levels of the input signal typically corresponding to sequences of 0's in the transmitted data. The peak detector outputs are averaged to obtain the optimal slicing threshold. This threshold is then used to determine the received digital data.

The data slicer incorporates adaptation circuitry that is operative to dynamically adjust the discharge rate of the holding circuits in the two peak detectors. A discharge processor functions to generate a control signal used to control the discharge rate, i.e., time constants or discharging current, of both peak detectors. The maximum peak detector is discharged to ground while the minimum peak detector is discharged to the supply voltage.

The control signal is generated in accordance with a particular function chosen to exhibit desired discharge properties. The input to the function is the difference between the two peak detector output signals. Thus, the data slicer is able to quickly adapt to varying signal parameters or conditions while maintaining enhanced performance. The function may be chosen to provide any desired discharge characteristics. Note that both linear and non-linear functions may be used with the invention.

A simplified example of a discharge processor is presented wherein the discharge rate is accelerated by a predefined amount when the two peaks detector output signals deviate more than a certain threshold. In addition, discharge is disabled when the two peaks detector output signals deviate below a certain threshold.

The benefits of the adaptive data slicer presented herein include (1) enabling its analog implementation within an integrated RF transceiver without the use of digital processing and the drawbacks associated therewith, (2) the required silicon area and current consumption in realizing the adaptive data slicer is quite reasonable, (3) high performance (i.e., low BER) for a received signal exhibiting variations in signal properties, and (4) substantially no packet loss due to the failure of the data slicer to adapt to changes in the input signal.

The adaptive data slicer is applicable to numerous types of communications systems. In particular, the present invention is applicable for use in communication systems employing FSK modulation. In particular, the invention is applicable for use in an FSK receiver constructed in accordance with the Bluetooth specification or DECT compatible communication systems. The signal input to the adaptive data slicer would, in this case, comprise the output of the FM discriminator portion of the receiver or the output of any other type of demodulator.

There is thus provided in accordance with the present invention an adaptive data slicer for generating digital data from an input signal comprising a maximum peak detector for detecting the highest levels of the input signal and for generating a maximum peak detection signal therefrom, a minimum peak detector for detecting the lowest levels of the input signal and for generating a minimum peak detection signal therefrom, a first discharge circuit adapted to discharge the maximum peak detector signal to ground in accordance with one or more discharge control signals, a second discharge circuit adapted to discharge the minimum peak detector signal to a supply voltage in accordance with the one or more discharge control signals, a processor adapted to generate the one or more discharge control signals in accordance with a function of the maximum peak detection signal and the minimum peak detection signal, averaging means for generating an averaged signal representing the average of the maximum peak detection signal and the minimum peak detection signal and decision means for comparing the input signal with the averaged signal so as to generate a '1' when the input signal is greater than the averaged signal and to generate a '0' when the input signal is less than the averaged signal.

There is also provided in accordance with the present invention a method for adaptively data slicing an input signal and generating digital data therefrom, the method comprising the steps of detecting the highest levels of the input signal and generating a maximum peak detection signal therefrom, detecting the lowest levels of the input signal and generating a minimum peak detection signal therefrom, discharging the maximum peak detector signal to ground in accordance with a first function whose input includes the maximum peak detection signal and the minimum peak detection signal, discharging the minimum peak detector signal to a supply voltage in accordance with a second function whose input includes the maximum peak detection signal and the minimum peak detection signal, generating an average signal representing the average of the maximum peak detection signal and the minimum peak detection signal and comparing the input signal with the averaged signal so as to generate a '1' when the input signal is greater than the averaged signal and to generate a '0' when the input signal is less than the averaged signal.

There is further provided in accordance with the present invention a Frequency Modulation (FM) communications receiver comprising a receiver front end for converting a signal received from a channel to an Intermediate Frequency (IF) signal, an IF filter coupled to the receiver front end and adapted to filter the IF signal, an FM demodulator adapted to convert the output of the IF filter to a baseband signal, a baseband filter coupled to the FM demodulator and adapted to filter the baseband signal and an adaptive data slicer comprising means for detecting the highest and lowest levels of the baseband signal and generating a maximum peak signal and minimum peak signal, respectively, averaging means for generating an averaged signal representing the average of the maximum peak detection signal and the minimum peak detection signal, decision means for comparing the baseband signal with the averaged signal so as to generate a '1' when the baseband signal is greater than the averaged signal and to generate a '0' when the baseband signal is less than the averaged signal and means for discharging the maximum peak signal to ground and the minimum peak signal to a supply voltage in accordance with a function of the maximum peak signal and the minimum peak signal.

BRIEF DESCRIPTION OF THE DRAWINGS

The invention is herein described, by way of example only, with reference to the accompanying drawings, wherein:

FIG. 1 is a block diagram illustrating a first prior art data slicer circuit that utilizes a RC combination for smoothing the input voltage;

FIG. 2 is a block diagram illustrating a second prior art data slicer circuit that utilizes a DC blocking capacitor;

FIG. 3 is a block diagram illustrating a third prior art data slicer circuit that utilizes two back to back diodes;

FIG. 4 is a block diagram illustrating an example adaptive data slicer circuit constructed in accordance with the invention;

DETAILED DESCRIPTION OF THE INVENTION

Notation Used Throughout

Figure 5:
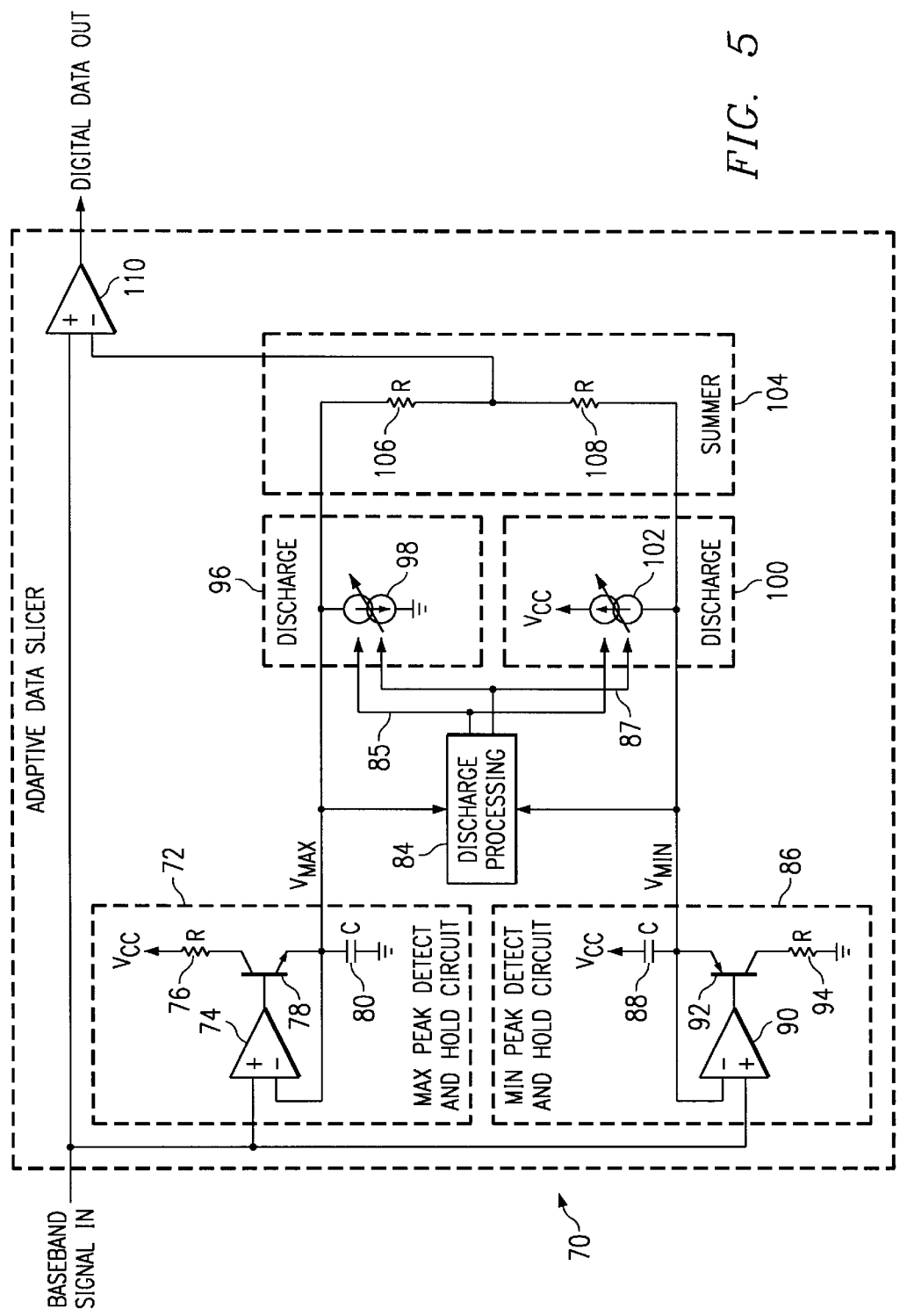
FIG. 5 is a block diagram illustrating an embodiment of the adaptive data slicer of the present invention in more detail.

The following notation is used throughout this document.

| Term | Definition |
| --- | --- |
| BER | Bit Error Rate |
| DC | Direct Current |
| DECT | Digital European Cordless Telecommunications |
| FET | Field Effect Transistor |
| FM | Frequency Modulation |
| FSK | Frequency Shift Keying |
| IF | Intermediate Frequency |
| IR | Infrared |
| ISI | Intersymbol Interference |
| RF | Radio Frequency |
| SNR | Signal to Noise Ratio |

General Description

The present invention is an adaptive data slicer that utilizes two peak detectors whereby the voltage on signal holding components integral thereto is altered in accordance with a specific function. The time constant of charge and discharge circuits can be dynamically changed in response to an adaptive time constant selection mechanism. This permits the data slicer to quickly adapt to varying signal parameters by using shorter time constants while maintaining enhanced performance by using longer time constants.

A block diagram illustrating an example adaptive data slicer circuit constructed in accordance with a preferred embodiment of the invention is shown in FIG. 4. The adaptive data slicer, generally referenced 40, comprises a maximum peak detect and hold circuit 42, minimum peak detect and hold circuit 44, discharge processing circuitry 48, maximum discharge circuit 50, minimum discharge circuit 52, halvers 54, 56, summer 58 and comparator 60.

The input to the slicer can be any signal whereby it is desired to determine a digital data stream therefrom. To illustrate the principles of the present invention, the data slicer is described in the context of a receiver in a Frequency Modulation (FM) communications system, e.g., a Frequency Shift Keying (FSK) receiver. Thus, the signal input to the data slicer 40 comprises the signal output from the baseband processor in an FSK receiver. Note that one skilled in the communications arts can appreciate that the data slicer of the present invention may be applied to numerous other types of communications systems as well.

In operation, the data slicer circuitry 40 comprises two peak detectors for detecting the peaks of a signal output of a baseband processor. The peak detectors are preferably constructed utilizing storage elements such as capacitors. One detector (max peak detector 42) is adapted to detect the highest level of the baseband signal (denoted $V_{MAX}$) such as when the received signal contains a number of consecutive 1's. The other detector (min peak detector 44) is adapted to detect the lowest level of the baseband signal (denoted $V_{MIN}$) such as when the received signal contains a number of consecutive 0's. The output of the two peak detectors 42, 44 are halved by halvers 54, 56 and subsequently summed via summer 58.

The combination of the halvers 54, 56 and the summer 58 functions to produce the average of the max and min peak detect signals. This average voltage represents the optimal slicing level to be used for the decision circuit 60. The optimal threshold $V_{TH-OPT}$ can be expressed as shown below in Equation 1.

$$V_{TH-OPT} = \frac{V_{MAX} - V_{MIN}}{2} \quad (1)$$

The averaged output of the summer 58 forms the threshold used by the decision circuit 60 that may comprise a comparator. The input baseband signal is compared with the optimal threshold and the comparator is operative to generate a '0' when the baseband signal is lower than the threshold and a '1' when it is higher.

As will be shown in more detail hereinbelow, the max and min peak detectors are preferably constructed based on capacitors that function to hold the peak voltages values detected. Due to the effects of noise and interference that may cause momentary peaks exceeding those of the received signal, a discharge circuit is used to constantly discharge the capacitors. The peak signal output of the maximum peak detector is discharged via discharge circuit 50, which is adapted to discharge to ground, while the peak signal output of the minimum peak detector is discharged via discharge circuit 52, which is adapted to discharge to the supply voltage, e.g., $V_{CC}$.

The discharge circuits 50, 52 are controlled by one or more control signals 46, 47 generated by the discharge processing circuitry 48. The processing circuitry is adapted to control the rate of discharge of both discharge circuits based on a certain function. Thus, one output of the function may comprise an accelerate signal which controls the rate of acceleration of the discharge circuits. The function may be predetermined and fixed or may be set on a dynamic basis. The function takes as input the maximum and minimum peak detect signals $V_{MAX}$, $V_{MIN}$. Further, a second output of the discharge processing circuit is a disable signal that freezes the rate of discharge of the discharge circuits.

Note that the function used to determine the discharge rate of the discharge circuits may comprise any desired properties and characteristics, e.g., may be either a linear or non-linear function. An example of a discharge processor that utilizes a non-linear function is presented in detail hereinbelow.

A block diagram illustrating an example embodiment of the adaptive data slicer of the present invention in more detail is shown in FIG. 5. The adaptive data slicer, generally referenced 70, comprises a maximum peak detect and hold circuit 72, a minimum peak detect and hold circuit 86, summer 104, decision circuit 110, discharge processor 84, max discharge circuit 96 and min discharge circuit 100.

In operation, the max peak detector 72 comprises an amplifier or comparator 74 connected to the input baseband signal via its non-inverting input, capacitor 80 and NPN transistor 78. When the baseband signal is higher than the capacitor voltage, the transistor conducts permitting the capacitor to charge from $V_{CC}$ via resistor 76. The output voltage $V_{MAX}$ of the max peak detector is taken across the capacitor 80. The rate of charging of capacitor C can be varied by switching different values for the resistor R.

Similarly, the min peak detector 86 comprises an amplifier or comparator 90 connected to the input baseband signal via its non-inverting input, capacitor 88 connected to $V_{CC}$ and PNP transistor 92. When the baseband signal is lower than the capacitor voltage, the transistor conducts permitting the capacitor to discharge to ground via resistor 94. The output voltage $V_{MIN}$ of the min peak detector is taken between capacitor 88 and ground. The rate of charging of capacitor C can be varied by switching different values for the resistor R.

Alternatively, the maximum peak detector may be constructed using an N-channel FET with the resistor replaced by a constant current source connected to $V_{CC}$. Likewise, the minimum peak detector may be alternatively constructed using a P-channel FET with the resistor replaced by a constant current source connected to ground.

The discharge processor, utilizing a particular function, generates the accelerate discharge control signal 85 and disable discharge control signal 87 for the max and min discharge circuits 96, 100, respectively. The accelerate and disable discharge control signals are derived from the max and min peak detect signals $V_{MAX}$, $V_{MIN}$. The max discharge circuit 96 comprises a constant current source 98 connected between the output of the maximum peak detector and ground. The min discharge circuit comprises a constant current source 102 connected between the minimum peak detector and $V_{CC}$.

The maximum and minimum peak detector signals are averaged in summer 104 which comprises resistors 106, 108 having a value R such that the voltage on the node in common represents the average of the two detector signal as expressed above in Equation 1. The output of the summer 104 is the optimal slicing threshold and is used in the decision circuit 110 to generate the digital data output stream. The decision circuit 110 may comprise a comparator or other suitable decision means.

As previously described above, the discharge circuits function to constantly discharge the capacitors within the peak holders to compensate for momentary peaks that exceed the peaks of the received signal. The variations in the signal itself affect the performance of the data slicer. These signal variations may be caused by a variety of factors some of which include: variation in modulation index h $$\left( h = \frac{\text{frequency deviation}}{\text{bit rate}} \right),$$

frequency errors, frequency droop, interference, transmission of consecutive zeros or ones, low SNR, depending on the protocol—a lack of idle transmit time before a packet, etc.

In addition, variations in the parameters of the particular receiver used may affect the performance of the data slicer. Some example receiver parameters include: IF filter center frequency, IF filter bandwidth, baseband gain, frequency conversion accuracy and baseband corner frequency.

Figure 6:
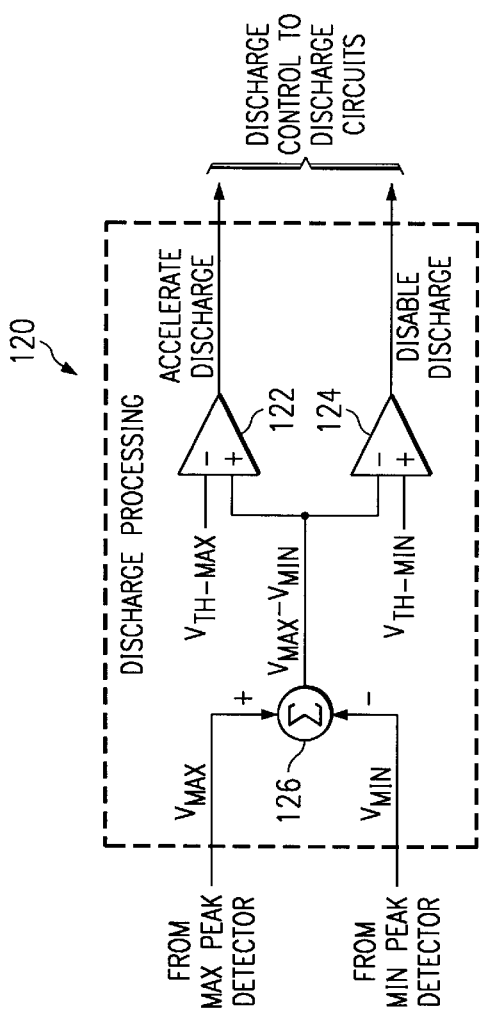
FIG. 6 is a block diagram illustrating an example embodiment of the discharge processing circuitry in more detail.

A block diagram illustrating an example embodiment of the discharge processing circuitry in more detail is shown in FIG. 6. The discharge processor and related circuits are used to combat the variations in both the signal and receiver. The example discharge processor, generally referenced 120, is one example discharge processor that comprises non-linear functions for generating the discharge control signals. The processor 120 comprises a difference circuit 126 and two comparators 122, 124. The input to the difference circuit comprises the $V_{MAX}$ and $V_{MIN}$ signals output of the max and min peak detectors (FIG. 5), respectively. The difference circuit 126 functions to generate the difference (denoted $V_{MAX}-V_{MIN}$) between the maximum and minimum peak detect signals.

In operation, when the difference between the maximum and minimum peak detect signals exceeds a predetermined maximum threshold voltage denoted by $V_{TH\text{-}MAX}$ the discharge rate of the peak holding capacitors is accelerated. For example, assume the expected peak to peak of the baseband signal is 0.5 $V_{P\text{-}P}$, thus the nominal difference voltage is 0.5 V. $V_{TH\text{-}MAX}$ could be set slightly above this value, e.g., at 0.55 V, and in the event the peak to peak voltage exceeded this threshold, the discharge rate would be accelerated by a certain amount configurable by the user, e.g., 30 times the normal rate. Thus, in this manner degradation of the data slicer caused by noise spikes or interference is reduced. Sharp increases in the max peak detect signal or sharp decreases in the min peak detector are compensated for by acceleration of the discharge rate of the respective capacitor in the peak detect circuits. Note that the max peak detector is discharged toward ground while the min peak detector is discharged towards $V_{CC}$.

The discharge processor also comprises means for completely disabling the discharging of the peak detector hold circuits. When the difference between the maximum and minimum peak detect signals drops below a predetermined minimum threshold voltage denoted by $V_{TH\text{-}MIN}$ discharging is disabled. This may happen, for example, when a large number of consecutive zeros are received. Using the example above, wherein the expected peak to peak $V_{P\text{-}P}$ of the baseband signal is 0.5 V, if $V_{TH\text{-}MIN}$ is set to 0.25 V, the discharge would be disabled once the difference between the voltages of the peak detectors drops below this value, as a result, for example, of receiving many consecutive 1's or 0's.

Note that in the preferred embodiment, the control signal for the acceleration of the discharge rate is fed to both max and min discharge circuits since it is not known which peak detect output signal is exceeding the threshold. Likewise, when disabling the discharge rate, the control signal is fed to both max and min discharge circuits since it is not known which peak detect output signal is drooping.

In an alternative embodiment (not shown) separate sets of thresholds (e.g., a maximum and a minimum) may be used in both the max and min peak detectors with each set having independent control signals associated therewith. This embodiment is particularly useful when there is less ambiguity as to the DC level of the recovered baseband signal at the input of the circuit.

In accordance with this alternative embodiment, the adaptive data slicer comprises a first threshold for the acceleration of the discharge of the max, i.e., positive, peak detector and a second threshold for the acceleration of the min, i.e., negative, peak detector. Note that both the first and second thresholds may be fixed or configurable. Thus, the acceleration of the discharge rates of the max and min peak detectors is controlled individually rather than in unison as the embodiment illustrated in FIG. 4.

Further, the peak detector circuits may be adapted to provide a 'hold' input (not shown) whereby an external processor can activate a holding mode in the data slicer. In this case, the maximum and minimum thresholds $V_{TH\text{-}MAX}$ and $V_{TH\text{-}MIN}$ are held constant at the values acquired throughout the preamble of the received packet. For example, in the case of a Bluetooth compatible signal, the hold mode may be activated after the access code is detected and it is assumed the slicer is set to the optimal slicing level.

One of two optional holding modes may be selected. The first mode functions to slow the operation of the peak detector hold circuits by increasing their charging time constants. This enables the data slicer to track any slow frequency droop the signal may have, while suppressing the effect of additive noise on the slicing provided to the decision circuit. The second mode is a complete 'freezing' of the discharge circuitry (i.e., complete disconnection of the peak holding circuits and the discharge circuitry) which is helpful in (1) improving the performance of relatively short packets wherein the frequency droop is negligible or (2) with long packets originating from modulators wherein no frequency droop occurs.

Since the peak detector hold circuits are based on fixed capacitors, the time constant can be increased by switching a larger resistor into the circuit in order to put the data slicer into the 'hold' mode (i.e., slow tracking). During the freeze mode, the capacitors are completely disconnected from the charging and discharging circuits. In addition, the circuit is able to support the forcing of an arbitrary voltage across the capacitor so as to create any desired slicing level. This is useful for testing purposes and for determining the optimal slicing level by enabling the comparison of the performance obtained with the adaptive slicing circuit to that obtained using a fixed slicing level forced by the external voltages.

Alternatively, the charging circuits in the max and min peak detect circuitry may be realized utilizing constant or variable current sources in similar fashion to the realization of the max and min discharge circuits. Utilizing low amounts of current enables the use of small values of capacitors, implementable in integrated circuit form, so as to create an equivalent long time constant. The rate of charging may be varied by adjusting the output current of the current source, analogous to the realization of the max and min discharge circuits. This is in contrast to varying the rate of charging by switching the value of resistors placed in series with the capacitor.

Application to an FSK Receiver

Figure 7:
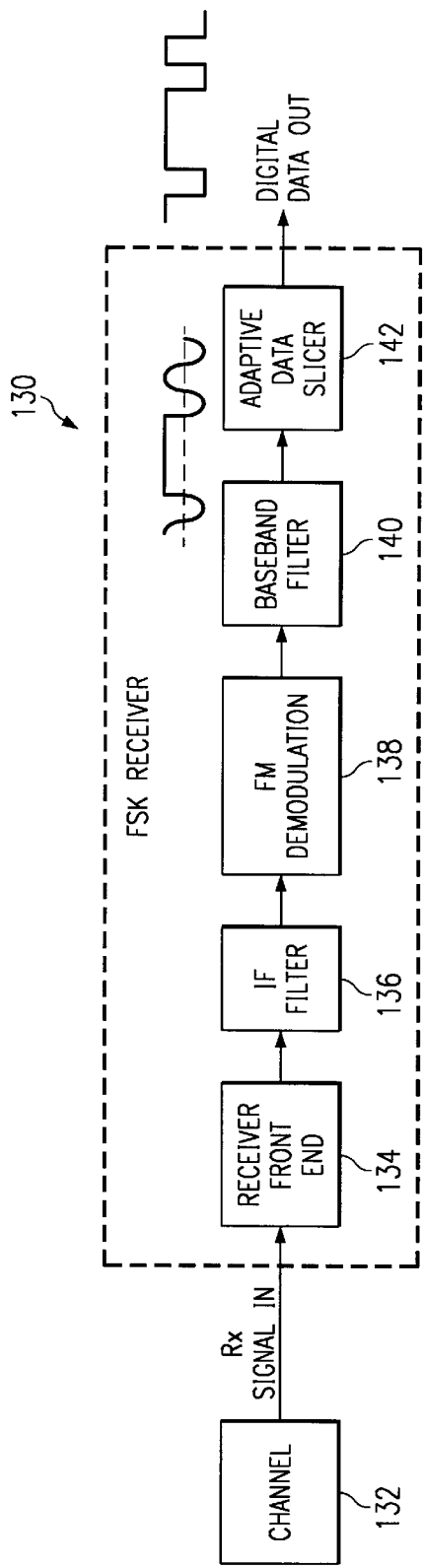
FIG. 7 is a block diagram illustrating an example receiver incorporating a data slicer constructed in accordance with the present invention.

A block diagram illustrating an example receiver incorporating a data slicer constructed in accordance with the present invention is shown in FIG. 7. The receiver, generally referenced, 130, comprises a receiver front end 134 adapted to receive the signal from the channel 132. Note that the channel may comprise any suitable media such as wireless RF, IR, twisted pair, coaxial cable, etc. In the case when the channel is wireless RF, the receiver front end comprises a suitable antenna, amplifier, filtering and frequency conversion adapted to pick up the transmitted signal.

The receiver front end 134 functions to convert the RF signal received from the channel to an IF signal. The IF signal is filtered via the IF filter 136 and input to the FM demodulator 138. The FM demodulator functions to convert the filtered IF signal to baseband. The baseband signal is filtered via baseband filter 140 and subsequently input to an adaptive data slicer 142 constructed in accordance with the present invention. Note that variations in the DC level of the filtered baseband signal correspond to inaccuracies in the value of the carrier frequency. The output of the data slicer is a digital data stream representing the original baseband signal.

Figure 8:
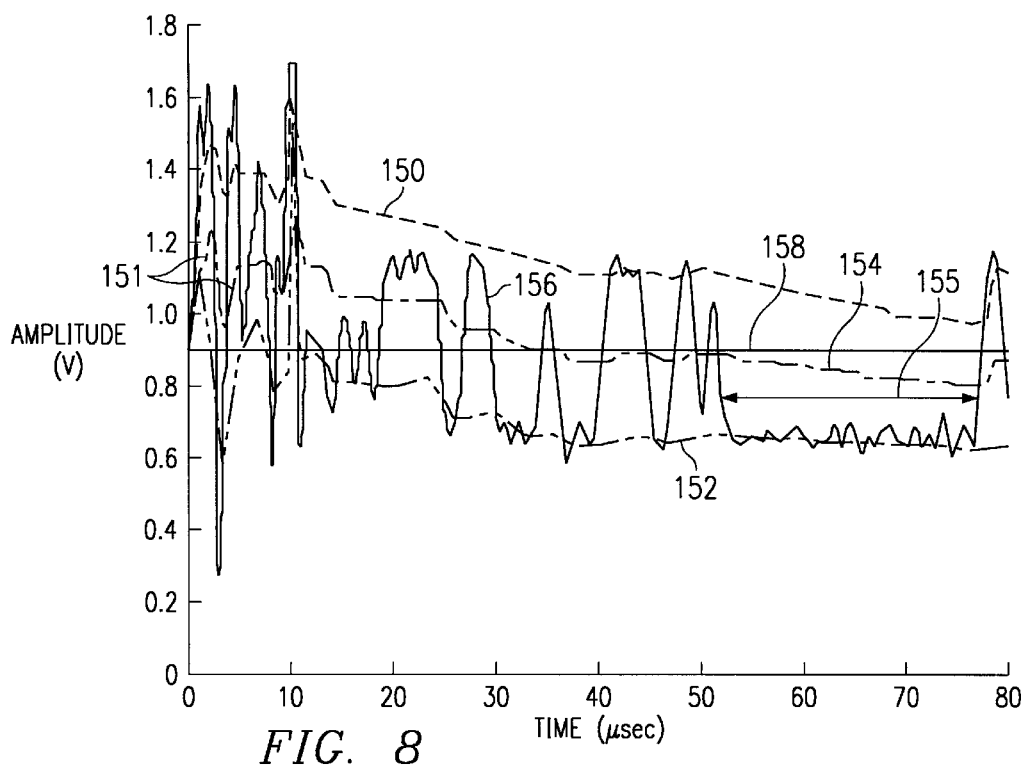
FIG. 8 is a waveform diagram illustrating the output of the discriminator, peak detectors and the slicing level.

A waveform diagram illustrating the typical waveforms found within the data slicer circuit is shown in FIG. 8. Waveform 156 represents the demodulated baseband signal including noise and interference. Note that there is no idle period in the waveforms shown, i.e. the first bits received are preceded with noise and not with a DC level representing the non-modulated carrier. Waveform 158 represents the optimal slicing level corresponding to the DC level of a non-modulated carrier at the given frequency (i.e., the nominal IF plus a frequency error). Waveform 154 represents the slicing threshold level produced by the adaptive data slicer. Waveform 150 represents the voltage generated by the maximum peak detector while waveform 152 represents the voltage generated by the minimum peak detector (i.e., the voltages across the max and min peak holding capacitors). The y-axis represents amplitude while the x-axis represents time in microseconds.

A modulation index h=0.32 was used to generate the waveforms, charging $\tau=2$ $\mu$sec, discharge rate=1 mV/$\mu$sec, discharge acceleration factor of 30, acceleration threshold of 110% and a hold threshold of 50%.

The first portion of the baseband signal (waveform 156) up to approximately 15 microseconds comprises random noise from the output of the previous stage, typically the discriminator, as a result of the absence of an input signal, i.e., a quieting carrier. This causes the data slicer to initialize its max and min peak detectors to values that do not correspond with the peaks of the signals, nor to the difference between them (i.e., the nominal peak to peak amplitude). This portion of the input signal is dealt with by the accelerated discharge feature of the present invention. As a result, the data slicer is more quickly prepared to receive data once the initial period ends and the output of the discriminator reflects the received signal.

Note that the slicing level produced by the data slicer exhibits relatively little droop during the group of 26 consecutive zeros whose time span of 26 microseconds is denoted by reference numeral 155. At time instances denoted by reference numeral 151, the slope of the slicing level is much steeper due to the difference between the voltages on the peak holding circuits exceeding $V_{TH-MAX}$ at that instant in time. In addition, an automatic shutdown (or discharge disablement) is illustrated towards the end of the sequence of 26 zeros at time 70 microseconds.

Figure 9:
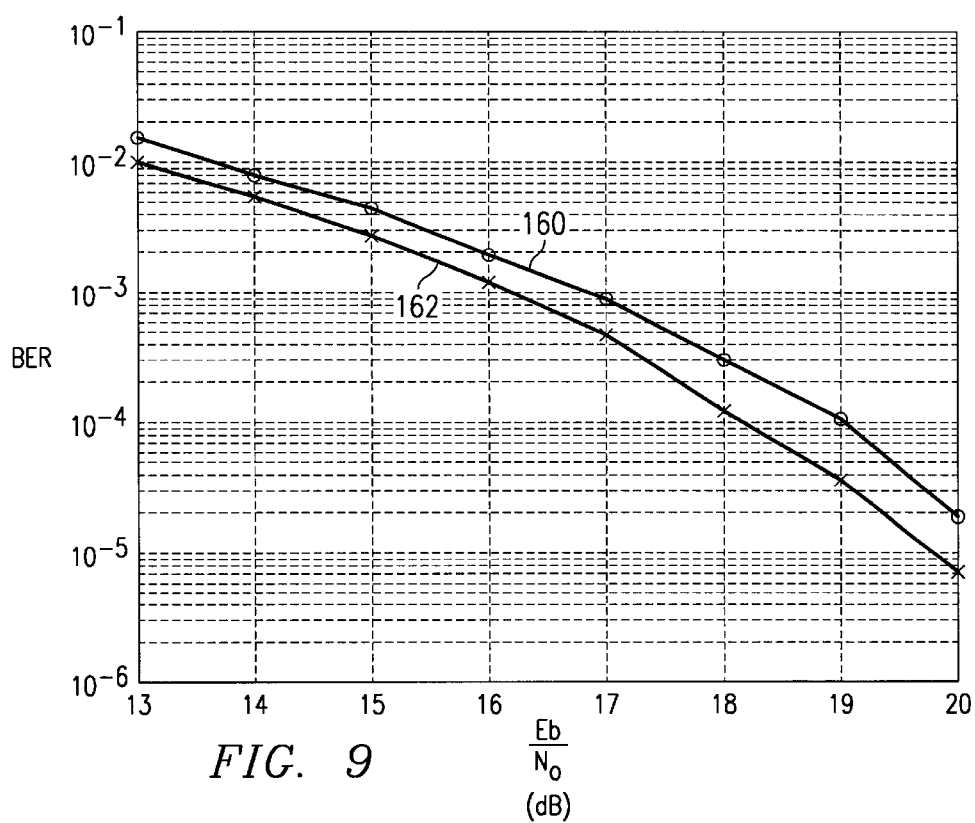
FIG. 9 is a diagram illustrating the BER performance of the data slicer of the present invention compared with that of a fixed theoretical fixed slicer using the optimal slicing level.

A diagram illustrating the BER performance of an example data slicer constructed in accordance with the present invention compared with that of a fixed theoretical fixed slicer is shown in FIG. 9. Waveform 160 represents the BER curve achieved using the adaptive data slicer of the present invention. Waveform 162 represents a reference BER curve that is shown for comparison. It represents the simulated results obtained when the optimal slicing level is used. Note that the optimal slicing level is determined using the exact center frequency of the received signal. The y-axis represents the BER and the x-axis represents the SNR ($E_b/N_o$) in dB.

It is important to point out that the performance degradation of the adaptive data slicer is less than 1 dB. For example, for the same BER of $2\times10^{-4}$ the required SNR of the adaptive data slicer is only ½ dB more than that of the slicer fixed at a middle level. Stated another way, for the same SNR of 18 dB, the BER of the adaptive data slicer is only about $1.5\times10^{31\ 4}$ more than the BER of the slicer fixed at the middle level.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. An adaptive data slicer for generating digital data from an input signal, comprising:

a maximum peak detector for detecting the highest levels of said input signal and for generating a maximum peak detection signal therefrom;

a minimum peak detector for detecting the lowest levels of said input signal and for generating a minimum peak detection signal therefrom;

a first discharge circuit adapted to discharge said maximum peak detector signal to ground in accordance with one or more discharge control signals;

a second discharge circuit adapted to discharge said minimum peak detector signal to a supply voltage in accordance with said one or more discharge control signals;

a processor adapted to generate said one or more discharge control signals in accordance with a function of said maximum peak detection signal and said minimum peak detection signal;

averaging means for generating an averaged signal representing the average of said maximum peak detection signal and said minimum peak detection signal; and decision means for comparing said input signal with said averaged signal so as to generate a '1' when said input signal is greater than said averaged signal and to generate a '0' when said input signal is less than said averaged signal.

2. The data slicer according to claim 1, wherein said processor comprises a function of said maximum peak detection signal and said minimum peak detection signal.

3. The data slicer according to claim 2, wherein said function comprises a difference function.

4. The data slicer according to claim 1, wherein said function in said processor is adapted to accelerate the discharge rate of said first discharge circuit and said second discharge circuit when the difference between said maximum peak detection signal and said minimum peak detection signal exceeds a first threshold.

5. The data slicer according to claim 4, wherein said first threshold comprises a predetermined threshold.

6. The data slicer according to claim 4, wherein said first threshold is dynamically set via threshold setting means.

7. The data slicer according to claim 1, wherein said function in said processor is adapted to disable discharging of said first discharge circuit and said second discharge circuit when the difference between said maximum peak detection signal and said minimum peak detection signal falls below a second threshold.

8. The data slicer according to claim 7, wherein said second threshold comprises a predetermined threshold.

9. The data slicer according to claim 7, wherein said second threshold is dynamically set via threshold setting means.

10. The data slicer according to claim 1, wherein said first discharge circuit comprises a constant current source connected to ground.

11. The data slicer according to claim 1, wherein said second discharge circuit comprises a constant current source connected to said supply voltage.

12. The data slicer according to claim 1, wherein said input signal comprises the output of a baseband processor in a Frequency Shift Keying (FSK) communications receiver.

13. The data slicer according to claim 1, wherein said maximum peak detector comprises an RC charging circuit.

14. The data slicer according to claim 13, wherein said RC charging circuit comprises a selectable resistance.

15. The data slicer according to claim 1, wherein said minimum peak detector comprises an RC charging circuit.

16. The data slicer according to claim 15, wherein said RC charging circuit comprises a selectable resistance.

17. The data slicer according to claim 1, wherein said maximum peak detector comprises a current source.

18. The data slicer according to claim 17, wherein said current source comprises a fixed current source.

19. The data slicer according to claim 17, wherein said current source comprises a variable current source.

20. The data slicer according to claim 1, wherein said minimum peak detector comprises a current source.

21. The data slicer according to claim 20, wherein said current source comprises a fixed current source.

22. The data slicer according to claim 20, wherein said current source comprises a variable current source.

23. The data slicer according to claim 1, wherein said maximum peak detector is adapted to maintain a first set of thresholds and wherein said minimum peak detector is adapted to maintain a second set of thresholds separate and independent from said first set of thresholds.

24. A method for adaptively data slicing an input signal and generating digital data therefrom, said method comprising the steps of:
   detecting the highest levels of said input signal and generating a maximum peak detection signal therefrom;
   detecting the lowest levels of said input signal and generating a minimum peak detection signal therefrom;
   discharging said maximum peak detector signal to ground in accordance with a first function whose input includes said maximum peak detection signal and said minimum peak detection signal;
   discharging said minimum peak detector signal to a supply voltage in accordance with a second function whose input includes said maximum peak detection signal and said minimum peak detection signal;
   generating an average signal representing the average of said maximum peak detection signal and said minimum peak detection signal; and
   comparing said input signal with said averaged signal so as to generate a '1' when said input signal is greater than said averaged signal and to generate a '0' when said input signal is less than said averaged signal.

25. The method according to claim 24, wherein said first function is adapted to accelerate the discharge rate of said maximum peak detection signal and said minimum peak detection signal when the difference therebetween exceeds a first threshold.

26. The method according to claim 24, wherein said first threshold comprises a predetermined threshold.

27. The method according to claim 24, wherein said first threshold is set dynamically in accordance with threshold setting means.

28. The method according to claim 24, wherein said second function is adapted to disable discharging of said maximum peak detection signal and said minimum peak detection signal when the difference therebetween falls below a second threshold.

29. The method according to claim 28, wherein said second threshold comprises a predetermined threshold.

30. The method according to claim 28, wherein said second threshold is set dynamically in accordance with threshold setting means.

31. The method according to claim 24, wherein said input signal comprises the output of a baseband processor in a Frequency Shift Keying (FSK) communications receiver.

32. The method according to claim 24, wherein said step of detecting the highest levels of said input signal comprises maintaining a first set of thresholds and wherein said step of detecting the lowest levels of said input signal comprises maintaining a second set of thresholds separate and independent from said first set of thresholds.

33. A Frequency Modulation (FM) communications receiver, comprising:
   a receiver front end for converting a signal received from a channel to an Intermediate Frequency (IF) signal;
   an IF filter coupled to said receiver front end and adapted to filter said IF signal; an FM demodulator adapted to convert the output of said IF filter to a baseband signal;
   a baseband filter coupled to said FM demodulator and adapted to filter said baseband signal; and
   an adaptive data slicer comprising:
      means for detecting the highest and lowest levels of said baseband signal and generating a maximum peak signal and minimum peak signal, respectively;
      averaging means for generating an averaged signal representing the average of said maximum peak detection signal and said minimum peak detection signal;
      decision means for comparing said baseband signal with said averaged signal so as to generate a '1' when said baseband signal is greater than said averaged signal and to generate a '0' when said baseband signal is less than said averaged signal; and
      means for discharging said maximum peak signal to ground and said minimum peak signal to a supply voltage in accordance with a fuinction of said maximum peak signal and said minimum peak signal.

* * * * *